Patented May 23, 1933

1,910,459

UNITED STATES PATENT OFFICE

HEINRICH BERTSCH, OF CHEMNITZ, GERMANY, ASSIGNOR TO THE FIRM H. TH. BÖHME AKTIENGESELLSCHAFT, OF CHEMNITZ, SAXONY, GERMANY, A CORPORATION OF GERMANY

PROCESS FOR PREPARING SULPHONIC ACIDS OF THE ALIPHATIC SERIES

No Drawing. Application filed April 30, 1930, Serial No. 448,807, and in Germany May 3, 1929.

The sulphonic derivatives of the higher members of the fatty acid series, in which a methylene hydrogen atom in the chain is replaced by the sulphonic group, are capable of manifold application as wetting, penetrating, dispersing, cleansing and foaming agents. These compounds have hitherto been prepared by causing sulphuric acid or other sulphonating agents, such as sulphuric anhydride or chlorsulphonic acid, to react with the fatty acids. This mode of operation, however, very readily gives rise to oxidation and partial carbonization, so that not only do losses of material occur, but the products obtained are also usually of a dark colour and, therefore, not applicable for many purposes such as, for example, the treatment of textiles, when it is a question of producing or preserving light colour tones.

According to this invention it has been found that the α-sulphonic compounds of the higher fatty acids may be obtained in a smooth reaction without any decomposition or injurious secondary reactions taking place by causing the α-bromo aliphatic acids, prepared in known manner, for example by the action of red phosphorus and bromine on the fatty acids, to interact with aqueous alkali sulphite solutions. In this way there are obtained solutions of the alkali salts of α-sulphonic aliphatic acids, which for most purposes may be directly employed without purification. They can, however, also be readily freed from inorganic admixtures and be obtained pure. On the other hand when these compounds are prepared by the direct action of sulphonating agents on fatty acids, they contain, after the conversion is completed besides excess of acid which can be easily washed out, also other dark coloured impurities, which cannot be easily removed and which result from local overheating and carbonization phenomena, so that the preparation of pure sulphonic acids from these products is attended with considerable difficulties.

Example 28 gms. of bromolauric acid are dissolved in aqueous ammonia and the solution boiled for 6 hours under reflux with a concentrated aqueous solution of 35 kgms of ammonium sulphite. A solution of the ammonium salt of α-sulphonic lauric acid is obtained, which can be directly employed without further purification. In order to free the sulphonic acid from inorganic admixtures, the solution may be acidified, while still hot, with hydrochloric acid, when the sulphonic acid is deposited as an oil, which can be separated.

The bromo-derivatives of other higher fatty acids can be worked up in a similar manner.

The sulphonic fatty acids or their alkali salts obtained in this way are suitable adjuvants or auxiliaries for all those technical processes, which depend on wetting, penetrating, transference of active constituents, protective colloid action, emulsifying, washing and cleansing action as well as on the production of foam. Examples of important industries in which the products according to this invention may be suitably employed, are the textile and leather industries, the splitting of fats, the pharmaceutical, ceramic and metal-working industries and the preparation of vermicides and dust-laying agents.

What I claim is:—

1. A process for preparing the alkali salts of sulphonic derivatives of the higher aliphatic acids, which consists in causing water soluble salts of the corresponding α-bromo aliphatic acids to interact with an alkali sulphite in an aqueous solution.

2. The process of producing substances suitable as wetting, penetrating, purifying, emulsifying and foaming agents comprising, causing a water soluble salt of an α-bromo derivative of a higher molecular fatty acid to react with an alkali sulphite in an aqueous solution in the presence of heat whereby an alkali salt of the sulphonic derivative of the fatty acid is formed.

3. The process as described in claim 1, wherein the α-bromo derivative of a higher molecular fatty acid is that of lauric acid.

4. The process as described in claim 1, wherein the α-bromo derivative of a higher molecular fatty acid is that of lauric acid and the alkali sulphite is ammonium sulphite.

5. The process of preparing an alkali salt of a sulphonic derivative of a higher aliphatic acid comprising, boiling with refluxing a mixture of a water soluble salt of an α-bromo higher molecular aliphatic acid and an alkali sulphite in an aqueous solution until said substances react.

In testimony hereof I hereunto affix my signature this 19th day of April 1930.

HEINRICH BERTSCH.